United States Patent

[11] 3,540,385

[72] Inventor Edward D. Hobart
 Westchester, Illinois
[21] Appl. No. 745,810
[22] Filed July 18, 1968
[45] Patented Nov. 17, 1970
[73] Assignee Mojonnier Bros. Co.,
 Chicago, Illinois
 a corporation of Illinois

[54] MATERIALS HANDLING PALLET
 4 Claims, 4 Drawing Figs.
[52] U.S. Cl. .................................................. 108/51,
 108/58
[51] Int. Cl. ........................................... B65d 19/38
[50] Field of Search ............................. 108/51—58

[56] References Cited
 UNITED STATES PATENTS
2,662,711 12/1953 Lapham ...................... 108/52
2,692,107 10/1954 Ridder et al. ................. 108/51
3,126,843 3/1964 De Laney ..................... 108/52
3,172,374 3/1965 Allen ........................... 108/51
3,329,103 7/1967 Cohen .......................... 108/54

Primary Examiner—Bobby R. Gay
Assistant Examiner—Glenn O. Finch
Attorney—Olson, Trexler, Wolters & Bushnell ABSTRACT: A materials handling pallet comprises plate members, rectangularly tubular beam members and rectangularly tubular purlin members. The plate members are disposed in parallel widely spaced relationship, and the beam members are disposed in similar relationship over the plate members transversely thereof. The purlin members are disposed in parallel, relatively closely spaced relationship over the beam members transversely thereof to form a load supporting grid.

Patented Nov. 17, 1970
3,540,385
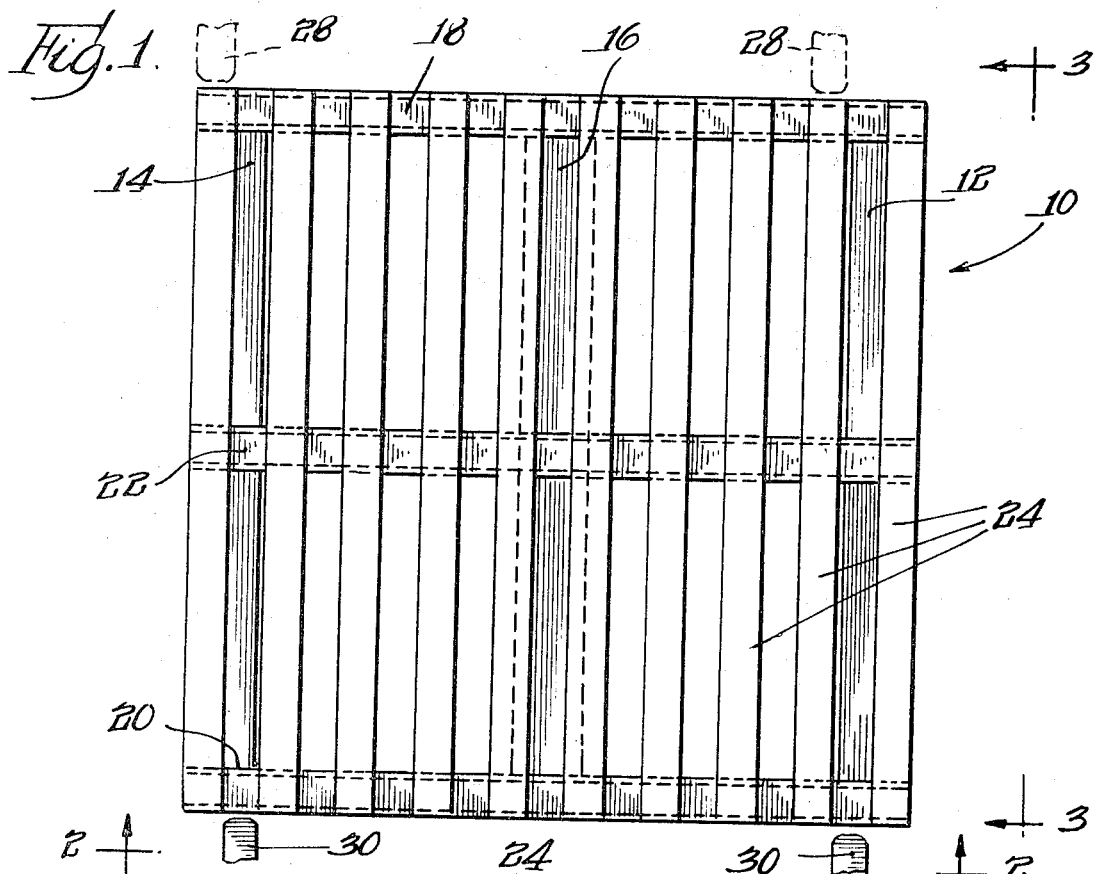
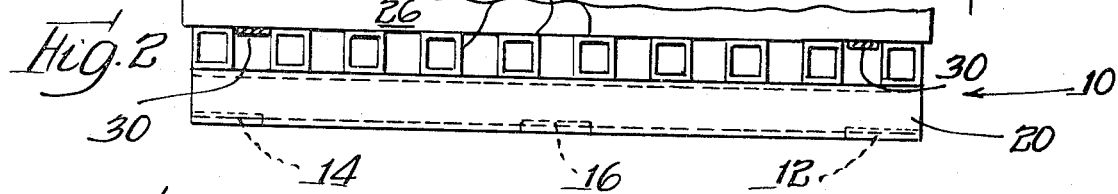
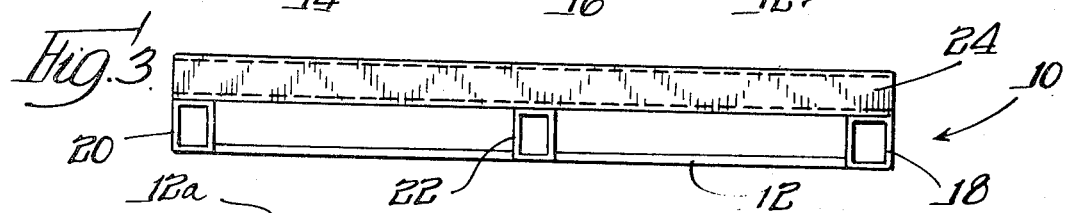
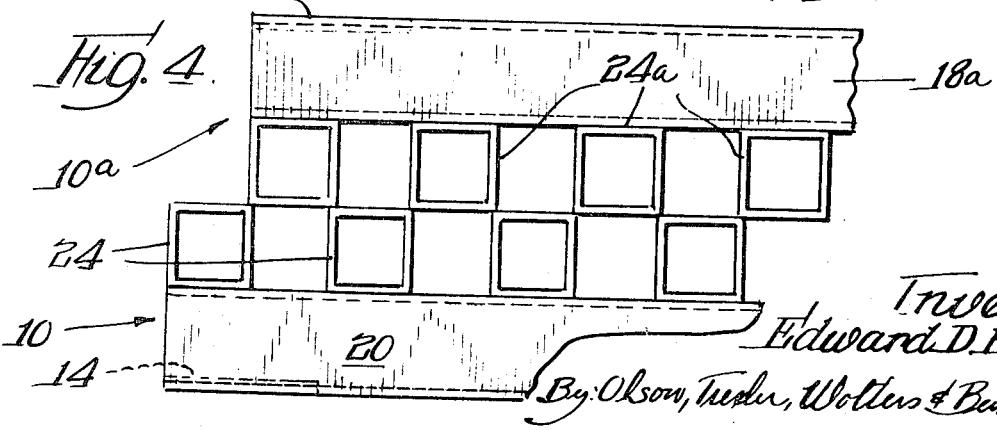
Inventor
Edward D. Hobart
By Olson, Trexler, Wolters & Bushnell
attys.

MATERIALS HANDLING PALLET

This invention relates generally to the materials handling art and more particularly to the construction of pallets for use in manipulating stacked goods.

Primarily as a result of cost considerations, materials handling pallets have heretofore been commonly constructed of wood; and the introduction of equipment for automatically stacking goods on these pallets has lead to certain standardization of pallet design, dimensions and weight. Use of pallet loading machinery has also demanded that the pallets be incapable of interlocking in any way whereby to avoid jams in the pallet magazines. In addition, experience with pallet handling has indicated that it is desirable to have the pallets amenable to two styles of manipulation by industrial lift trucks, namely lifting and transporting the pallet and stacked goods as a unit and lifting the goods off the pallet for separate transport. In the past, he requirement for noninterlocking has conflicted generally with the dual utility feature; and as a consequence, go/no-go utility has not been available in a pellet that could be satisfactorily handled in automatic, load-stacking equipment.

Accordingly, an important object of the present invention is to provide a materials handling pallet which overcomes the deficiencies of the prior art by being both incapable of interlocking when stacked vertically with other pallets and capable of go/no-go usage.

A more general object of the invention is to provide a new and improved materials handling pallet.

Still another object of the invention is to provide an all-metal materials handling pallet which is completely interchangeable with existing wooden pallets.

And still another object of the invention is to provide a materials handling pallet which is rugged and waterproof.

These and other objects and features of the invention will become more apparent from a consideration of the following descriptions.

In order that the principles of the invention may be readily understood, a single embodiment thereof, but to which the application is not to be restricted is shown in the accompanying drawing wherein:

FIG. 1 is a plan view of a materials handling pallet construction in accordance with the present invention, lift truck tines being suggested in solid outline at the bottom of the FIG. in position for lifting goods off of the pallet and lift truck tines being suggested in broken outline at the top of the FIG. in position for lifting the pallet and its load of goods as a unit;

FIG. 2 is a side elevational view taken substantially along line 2-2 of FIG. 1;

FIG. 3 is a side elevation view taken substantially along the line 3-3 of FIG. 1; and FIG. 4 is an enlarged view similar to the showing of FIG. 2 but illustrating the pallet stacked with an identical, inverted pallet and illustrating the manner in which interlocking is prevented.

Referring now in detail to the drawing, specifically to FIGS. 1-3, a materials handling pallet constructed in compliance with the present invention is indicated generally by the reference numeral 10. The pallet includes end plate members 12 and 14 and a medial plate member 16, plate members 12, 14 and 16 being disposed in parallel, relatively widely spaced relationship and generally in a common plane. The plate members may be two-piece members, as shown, or one-piece members, if desired. Superposed on the plate members and disposed transversely thereof are a pair of end beam members 18 and 20 and a medial beam member 22. The beam members 18, 20 and 22 are, like the plate members, disposed in parallel, relatively widely spaced relationship. In addition, the beam members are suitably fastened to the plate members whereby to form a base. Generally on top of the beam members 18, 20 and 22 are disposed a number of relatively closely spaced purlin members 24, the purlin members being disposed transversely of the beam members and suitably secured thereto to form a grid that is useful in supporting a load 26 of goods or merchandise as is suggested in FIG. 2.

In compliance with the features of the present invention, the beam members 18, 20 and 22 and the purlin members 24 are rectangularly tubular members; and in the disclosed embodiment, the beam members 18, 20 and 22 are rectangular with the major dimension of the rectangle upright whereby to develop strength in the pallet 10. The purlin members 24 are conveniently made square in cross-sectional outline. In order that the pallet 10 may be completely waterproof, all of the components are fabricated from metal, preferably a suitable aluminum alloy; and the several components are secured at lines of contact by welding for example. The various metal sections are selected so that the gross weight of the pallet 10 is approximately 40—50 pounds, and the pallet 10 is approximately 40-inches square overall and to take a thickness of somewhat over 5 inches. Thus, the pallet 10 is equivalent to a standard wooden pallet from a weight and dimension standpoint and is thus interchangeable therewith. As will be recognized, the all-metal fabrication of the pallet ensures a much longer use life and avoids problems arising from the splintering of wooden pallets.

In further accord with the principles of the present invention, the purlin members 24 are specially dimensioned and shaped. Considering FIG. 4, an identical pallet 10a is shown inverted over the pallet 10; and as is shown in the FIG., interlocking of the purlin members 24a of pallet 10a with the purlin members 24 of pallet 10 is obviated. More specifically, the purlin members 24a, are fabricated with a predetermined overall transverse dimension, such as for example 2¼ inches; and the purlin members are spaced apart by a lesser distance, as for example 2 inches. As a consequence, the purlin members 24a cannot ride into the spaces between the purlin members 24 to jam or lock the pallets together.

Pursuant to still another feature of the invention, the pallet 10 is arranged to have go/no-go utility. For this purpose, the ends of the purlin members 24 are left open to admit the tines of a forklift truck therein, as is suggested in FIG. 1 by the positioning of fork tines 28. With the tines 28 penetrating a substantial distance into the purlin members 24 aligned therewith, the truck fork may be actuated for lifting the pallet and any goods s tacked thereon as a unit. In addition, the spaces between the purlin members 24 are open laterally to admit the tines of a forklift truck, as is indicated by the positioning of the tines 30 in FIG. 1. Furthermore, the spaces between the purlin members 24 are arranged to open upwardly so as to pass the tines 30 into direct contact with the goods 26 stacked on the pallet. Thus, actuation of the forklift of the truck may be employed to raise the ties 30 and lift the goods 26 free of the pallet 10. Considerable facility in materials handling is achieved by this dual, go/no-go utility.

As will be apparent from an inspection of FIGS. 2 and 4, the plate members 12, 14 and 16 are selected to take the form of flat bars which are wider than the spaces between the purlin members 24. Thus, in normal stacking of a plurality of the pallets 10 with all of the purlin members upright relative to their associated beam members, the plate members 12, 14 and 16 span the spaces between the purlin members of the underlying pallet to promote automatic handling and prevent interlocking of the respective pallets.

It will be appreciated that the materials handling pallet of the invention combines a variety of advantageous features in a simple, rugged unit. The pallet of the invention is interchangeable with standard wooden pallets for automatic handling, and the present materials handling pallet is also amenable to a wide variety of handling techniques, particularly the described go/no-go utility.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation.

I claim:

1. A materials handling pallet having two pairs of opposed parallel sides and comprising: a plurality of plate members disposed in parallel, relatively widely spaced relationship and including a pair of plate members disposed along the edges of one pair of opposed sides of the pallet and an intermediate plate member therebetween; a plurality of rectangularly tubular beam members disposed in parallel, relatively widely spaced relationship traversing said plate members transversely thereof and including a pair of beam members disposed along the edges of the other pair of opposed sides of the pallet and an intermediate beam member therebetween, said beam members being secured to said plate members to form a base; and a plurality of rectangularly tubular purlin members disposed in parallel, relatively closely spaced relationship secured over said beam members transversely thereof to parallel said plate members and form a load-supporting grid, the outer purlin members providing access opening with said plate members at opposite sides of the pallet for lift truck arms to elevate the pallet and load and said purlin members affording end access openings therein for lift truck arm along the opposite pair of pallet sides to elevate the pallet and load and further providing access openings therebetween for lift truck arms to elevate a load from the pallet.

2. A materials handling pallet according to claim 1 wherein said purlin members are similar, have a predetermined overall transverse dimension, and are spaced apart by a distance less than said dimension whereby to obviate interlock with an identical, inverted pallet stacked vertically therewith.

3. A materials handling pallet according to claim 1 wherein said plate members are flat bars wider than the spaces between said purlin members.

4. A materials handling pallet according to claim 1 wherein the plate members comprise pairs of plate sections disposed between the end and intermediate beam members to form the base.